(12) United States Patent
Bouchard et al.

(10) Patent No.: US 10,815,070 B2
(45) Date of Patent: *Oct. 27, 2020

(54) SYSTEMS AND METHODS FOR SLEEVE DETECTION

(71) Applicant: United States Postal Service, Washington, DC (US)

(72) Inventors: Austin C. Bouchard, Washington, DC (US); Alexander S. Klinger, Silver Spring, MD (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,255

(22) Filed: Dec. 16, 2019

(65) Prior Publication Data

US 2020/0115167 A1 Apr. 16, 2020

Related U.S. Application Data

(63) Continuation of application No. 16/413,227, filed on May 15, 2019, now Pat. No. 10,507,985, which is a
(Continued)

(51) Int. Cl.
*B65G 43/08* (2006.01)
*B65G 47/53* (2006.01)
(Continued)

(52) U.S. Cl.
CPC .............. *B65G 43/08* (2013.01); *B65B 57/02* (2013.01); *B65B 69/00* (2013.01); *B65G 13/00* (2013.01);
(Continued)

(58) Field of Classification Search
None
See application file for complete search history.

(56) References Cited

U.S. PATENT DOCUMENTS

| 4,181,947 A | 1/1980 | Krauss et al. |
| 7,758,292 B2 | 7/2010 | Close et al. |

(Continued)

FOREIGN PATENT DOCUMENTS

| EP | 2 573 001 A2 | 3/2013 |
| WO | WO 02/096755 A1 | 12/2002 |

OTHER PUBLICATIONS

International Search Report and Written Opinion dated May 12, 2017 in PCT Application No. PCT/US2017/016978.
(Continued)

*Primary Examiner* — William R Harp
(74) *Attorney, Agent, or Firm* — Knobbe Martens Olson & Bear LLP (57) ABSTRACT

A device, system, and method for detecting a covering sleeve on a container. A sleeve detection system includes a conveyor, a height profile acquisition device, and a processor in communication with the height profile acquisition device. The height profile acquisition device is configured to acquire height profiles of a tray traveling on the conveyor. The processor is configured to analyze height profiles received from the height profile acquisition device to determine a sleeve status of the tray. In some embodiments, a light gate is disposed across the conveyor and configured to detect the presence of a tray on the conveyor approaching the height profile acquisition device.

20 Claims, 7 Drawing Sheets

Related U.S. Application Data continuation of application No. 16/033,969, filed on Jul. 12, 2018, now Pat. No. 10,294,039, which is a continuation of application No. 15/427,956, filed on Feb. 8, 2017, now Pat. No. 10,035,661.

(60) Provisional application No. 62/293,518, filed on Feb. 10, 2016.

(51) Int. Cl.
| | | |
|---|---|---|
| *G01B 11/06* | (2006.01) | |
| *B65B 57/02* | (2006.01) | |
| *B65B 69/00* | (2006.01) | |
| *B65G 13/00* | (2006.01) | |
| *G01B 17/00* | (2006.01) | |
| *G01V 8/20* | (2006.01) | |

(52) U.S. Cl.
CPC .......... *B65G 47/53* (2013.01); *G01B 11/0608* (2013.01); *G01B 17/00* (2013.01); *G01V 8/20* (2013.01)

(56) References Cited

U.S. PATENT DOCUMENTS

| | | |
|---|---|---|
| 8,561,381 B2 | 10/2013 | Close et al. |
| 10,035,661 B2 | 7/2018 | Bouchard et al. |
| 10,294,039 B2 | 5/2019 | Bouchard et al. |
| 10,507,985 B2 * | 12/2019 | Bouchard .............. G01B 17/00 |
| 2011/0135440 A1 | 6/2011 | Close et al. |

OTHER PUBLICATIONS

International Preliminary Report on Patentability dated Aug. 14, 2018 n PCT Application No. PCT/US2017/016978.

* cited by examiner

SYSTEMS AND METHODS FOR SLEEVE DETECTION

CROSS-REFERENCE TO RELATED APPLICATIONS

This application is a continuation of U.S. application Ser. No. 16/413,227, filed May 15, 2019, entitled "SYSTEMS AND METHODS FOR SLEEVE DETECTION," which is a continuation of U.S. application Ser. No. 16/033,969, now issued as U.S. Pat. No. 10,294,039, filed Jul. 12, 2018, entitled "SYSTEMS AND METHODS FOR SLEEVE DETECTION," which is a continuation of U.S. application Ser. No. 15/427,956, now issued as U.S. Pat. No. 10,035,661, filed Feb. 8, 2017, entitled "SYSTEMS AND METHODS FOR SLEEVE DETECTION," which claims the benefit of U.S. Provisional Application Ser. No. 62/293,518, filed Feb. 10, 2016, entitled "SYSTEMS AND METHODS FOR SLEEVE DETECTION," all of which are hereby incorporated by reference in their entirety and for all purposes.

BACKGROUND

Field

The disclosure relates to systems and methods for detecting the presence or absence of a covering or sleeve on a container.

Description of the Related Art

A container of items in a distribution network can be covered by a covering. For processing the items in a container, the covering must be removed. The covering removal is frequently automated.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one aspect described herein, a tray processing apparatus comprises a conveyor for transporting a tray; at least one height profile sensor disposed proximate the conveyor, and configured to determine a height profile of the tray on the conveyor; and a processor in communication with the height profile sensor; wherein the processor is configured to receive the height profile from the height profile sensor and analyze the height profile to determine a status of the tray.

In some embodiments, the at least one height profile sensor comprises at least one optical profile sensor.

In some embodiments, the at least one height profile sensor comprises at least one ultrasonic profile sensor.

In some embodiments, the at least one height profile sensor comprises a first height profile sensor and a second height profile sensor.

In some embodiments, the at least one height profile sensor is disposed on a frame connected to the conveyor such that the height profile sensor is located above the conveyor.

In some embodiments, the processor is configured to detect the presence of a sleeve on the tray.

In some embodiments, the conveyor comprises a junction device in communication with the processor, the junction device configured to direct the tray along a first path or a second path of the conveyor based on the determined tray status.

In some embodiments, the apparatus tray processing apparatus further comprises a tray detector disposed on the conveyor at a point upstream of the height profile sensor.

In some embodiments, the height profile acquisition device is configured to acquire at least one height profile based on a notification received from the tray detector.

In some embodiments, the height profile acquisition device is configured to acquire at least one height profile of the tray after a preset time delay following the detection of the tray at the tray detector.

In some embodiments, the height profile acquisition device comprises at least one optical profile sensor.

In some embodiments, the conveyor is configured to select a transport destination of the tray based at least in part on a determined sleeve status of the tray.

In some embodiments, the tray detector comprises a light gate.

In another aspect described herein, a method of detecting a sleeve comprises moving a tray along a conveyor; detecting the tray moving along the conveyor; determining at least one height profile of the tray using a height profile acquisition device; and analyzing the at least one height profile of the tray to determine a sleeve status of the tray.

In some embodiments, the method further comprises determining a transport destination of the tray based at least in part on the sleeve status of the tray.

In some embodiments, the method further comprises routing the tray to a first or second destination according to the determined sleeve status of the tray.

In some embodiments, the step of analyzing the at least one height profile of the tray to determine a sleeve status of the tray comprises receiving a height profile of at least a portion of the tray; identifying a high point of the tray from the height profile of the tray; determining whether any point of the height profile relatively nearer a centerline of the conveyor than the high point is below a set low threshold; determining the tray status as unsleeved based on the determined point below the set low threshold.

In some embodiments, the method further comprising determining a sleeve status of the tray based on the total number of analysis data points recorded for the tray and associated with an unsleeved status.

In some embodiments, terminating the analysis of height data points occurs based on a preset data viewing scope limit.

In another aspect described herein a sleeve detection system comprises means for detecting a tray in a transport system; means for determining at least one height profile of the tray; means for analyzing the at least one height profile of the tray to determine a sleeve status of the tray; means for determining a transport destination of the tray based at least in part on the sleeve status of the tray; and means for transporting the tray to the transport destination.

BRIEF DESCRIPTION OF THE DRAWINGS

The foregoing and other features of the disclosure will become more fully apparent from the following description and appended claims, taken in conjunction with the accompanying drawings.

DETAILED DESCRIPTION

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

In processing items in a distribution network, items can be transported in containers, such as trays. These containers can be covered or protected with a covering, such as a sleeve or other similar covering, which provides several advantages for processing and transport. A sleeve is a hollow covering for a tray which may have two open ends. A sleeve can be applied by sliding a tray into either of the two open ends, so that the surfaces of the tray cover the bottom, top, and two sides of the tray. A sleeve may be secured after being applied to a tray by means of an external strap. A sleeve protects the items within the tray from being damaged or lost by falling out of the tray. A sleeve also provides a flat upper surface that allows multiple trays to be stacked vertically for efficient storage or shipment. The containers may be strapped when they are transported between processing facilities to secure the covering to the container. Tray sleeves may be made from cardboard, various plastics, or any similar material. Sleeves may be rigid or semi-rigid to maintain their shape, or may be relatively flexible and maintain their shape based on the presence of a tray within the sleeve.

When a container enters a processing facility, the covering, or sleeve, needs to be removed in order to process the items within the tray. Incoming trays which have sleeves and straps can be processed through an automatic tray unsleever (ATU). In some embodiments, incoming trays can be manually unsleeved. Trays whose items will not be processed at the facility, or outgoing trays that are sleeved and strapped, may pass through the facility and be processed on a tray transport system (TTS, or trayline) equipment without removing the sleeve. Trays of items intended for transportation to other processing facilities or destinations may be generated at the processing facility. These trays can also be processed on the TTS.

ATUs are not able to remove 100% of sleeves for various reasons, including damage or wear to sleeves, poor ATU functionality due to lack of maintenance, improper alignment of the tray in the ATU, and other reasons. The failure of an ATU to remove a sleeve can result in a tray having a sleeve but not a strap. A sleeved, unstrapped tray can "walk" out of the sleeve during later trayline operations, effectively creating an extra-long tray which reduces efficiency of trayline systems, can create malfunctions, and creates additional work that must be done manually.

Additionally, there are normal trayline operations in which it would be helpful to sort trays based on their sleeved or unsleeved status. For example, sorting trays based on sleeve status is useful in determining whether to send a tray to an ATU, or where originating trays are processed on the same conveyor as destination trays. Although the present disclosure describes trays and sleeves, it will be understood that other containers and coverings can be used without departing from the scope of the present disclosure.

Sleeve detection systems can determine whether a sleeve is present on a tray while the tray is in motion on a conveyor, belt, or other similar device in a trayline. Preferably, a sleeve detection system will be able to accurately detect a sleeve regardless of whether the sleeve is properly fit or loosely fit, or if the sleeve has been crushed. Loose fitting of a sleeve can occur when a sleeve has been stretched after multiple uses, or when a defect occurs in the tray sleeving process. The upper surface of a sleeve may be crushed if excessive weight is stacked on top of the tray or if a sudden impact occurs, such as an item falling onto the tray. In some aspects, a sleeve detection system may be configured to provide sleeve status as a simple output, such as "no sleeve" or "has sleeve," which can be used by a trayline control system. The sleeve detection systems disclosed herein include at least one height profile acquisition device to collect cross-sectional height profiles of trays. The acquired height profile information may be processed in real time or near-real time, as a tray is passing through a sleeve detection system or shortly thereafter, to determine whether a sleeve is present. In some embodiments, sleeve detection systems may be integrated with existing barcode reading (scan) sections of a trayline, or may operate independently on a trayline. In some trayline systems, sleeve status determinations may be used as criteria for automatic sorting of trays via the trayline control system or similar tray transport management system.

Figure 1:
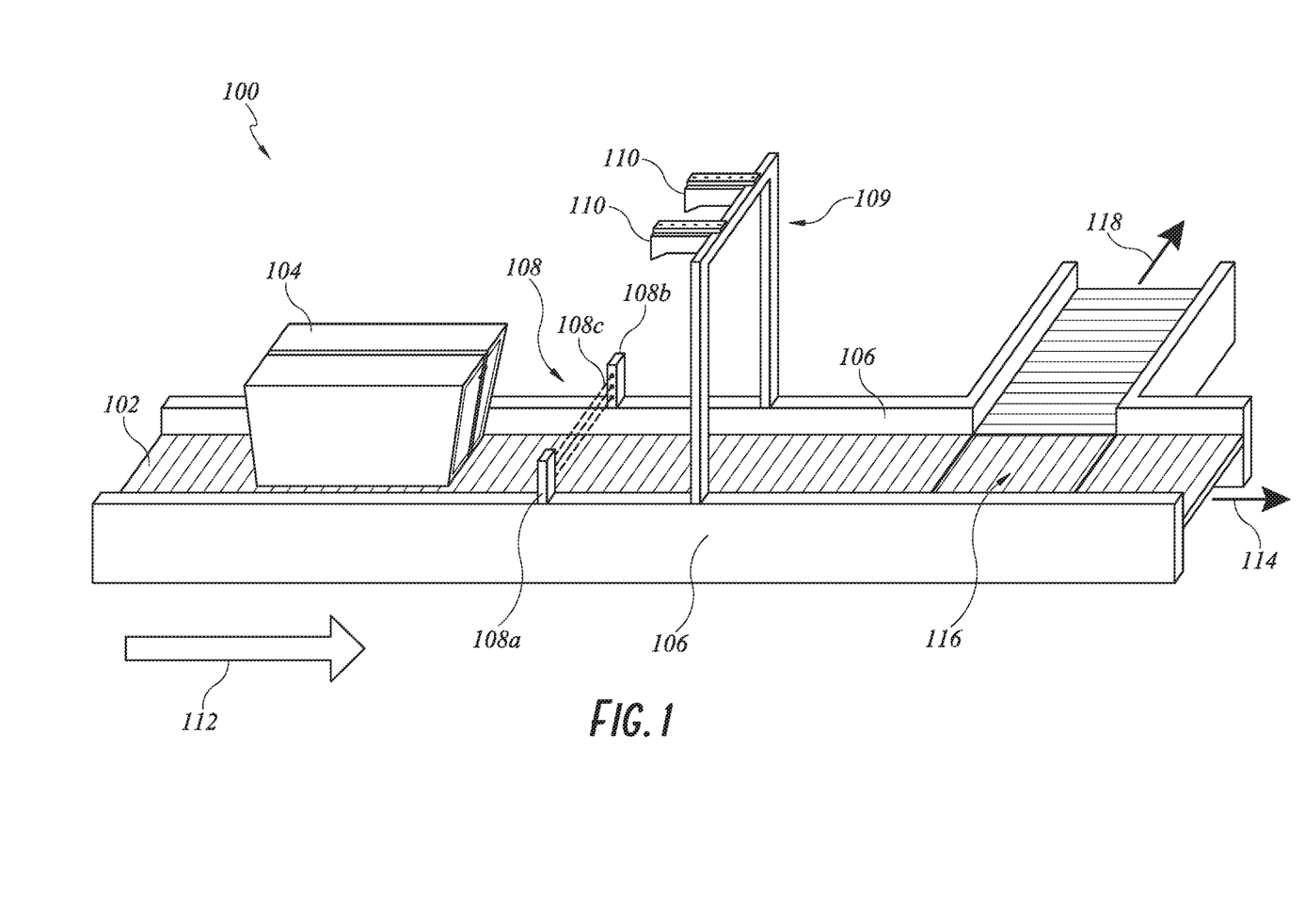
FIG. 1 is a perspective view of an embodiment of a sleeve detection system.

FIG. 1 depicts an embodiment of a sleeve detection system 100 in an automatic trayline system. The sleeve detection system 100 includes a trayline conveyor 102 disposed between raised sidewalls 106 and capable of transporting a tray 104 in a direction of motion 112. The sleeve detection system 100 includes a height profile acquisition device 109 in a transverse orientation across the conveyor, including one or more optical profile sensors 110 mounted above the conveyor. The sleeve detection system 100 further includes a transverse light gate 108 mounted to the sidewalls 106. The conveyor 102 includes a first path 114 and a second path 118, joined at a junction 116. The trayline conveyor 102 may include a moving conveyor belt surface, a series of rollers, or any other type of linear conveying system. The conveyor 102 conveys, transports, or otherwise moves a tray in the direction of motion 112. The trayline conveyor 102 is disposed between the raised sidewalls 106 to ensure that the tray 104 remains entirely on the conveyor 102.

In some embodiments, the first path 114 leads to a first destination, for example, to a tray unsleeving apparatus, and the second path 118 leads to a second destination, for example, a tray processing apparatus for unsleeved trays. The junction 116 can be a diverter gate, a rotating platform, or other similar feature that can route a tray 104 along either the first path 114 or the second path 116 according to a signal received from the optical profile sensor 110, or from a processor in communication with the height profile acquisition device 109. The junction 116 can have a controller (not shown) and a motor (not shown), the controller configured to receive a signal from the height profile acquisition device 109. The controller receives the signal, which can be, for example, "sleeve detected" or "no sleeve detected", or the like. The controller instructs the motor to move the junction 116 to direct the tray 104 along the appropriate path: along the first path 114 if "sleeve detected," or along the second path if "no sleeve detected."

The light gate 108 comprises a sensing system having posts 108a and 108b located on and extending vertically from the sidewalls 106 in a position so as to transmit a sensing signal such as a beam 108c which extends perpendicular to the direction of motion 112 above and across the surface of the conveyor 102. The light gate 108 is located on the sidewalls 106 at a location that is separated from the height profile acquisition device 109 in a direction that is opposite the direction of motion 112, so that objects traveling along the conveyor 102 will reach the light gate 108 before reaching the height profile acquisition device 109. As the tray 104 moves along the conveyor 102, it passes through and interrupts the beam 108c of the light gate 108. In response to detecting the tray 104 at the light gate 108, the system 100 causes the height profile acquisition device 109 to acquire one or more height profiles of the tray 104, either immediately or after a predetermined time delay, in order to determine whether the tray 104 has a sleeve. The light gate 108 and height profile acquisition device 109 are discussed in greater detail below with reference to FIGS. 2 and 3.

The system 100 determines a sleeve status of the tray 104. Methods for determining sleeve status are described in detail below with reference to FIGS. 5-7. Based on the sleeve status, the system 100 can divert the tray along the first path 114 or along the second path 118 at the junction 116. The first path 114 leads to processing equipment for unsleeved trays, such as destination sorting, tray sleeving equipment, or the like. The second path 118 leads to another piece of tray processing equipment, such as an ATU or the like. In some embodiments, the second path 118 delivers the tray 104 to a human operator or technician for manual evaluation or processing. The determination to send the tray 104 along the first path 114 or along the second path 118 is made based at least in part on height profiles received from the height profile acquisition device 109 and/or a determined sleeve status of the tray 104.

Figure 2:
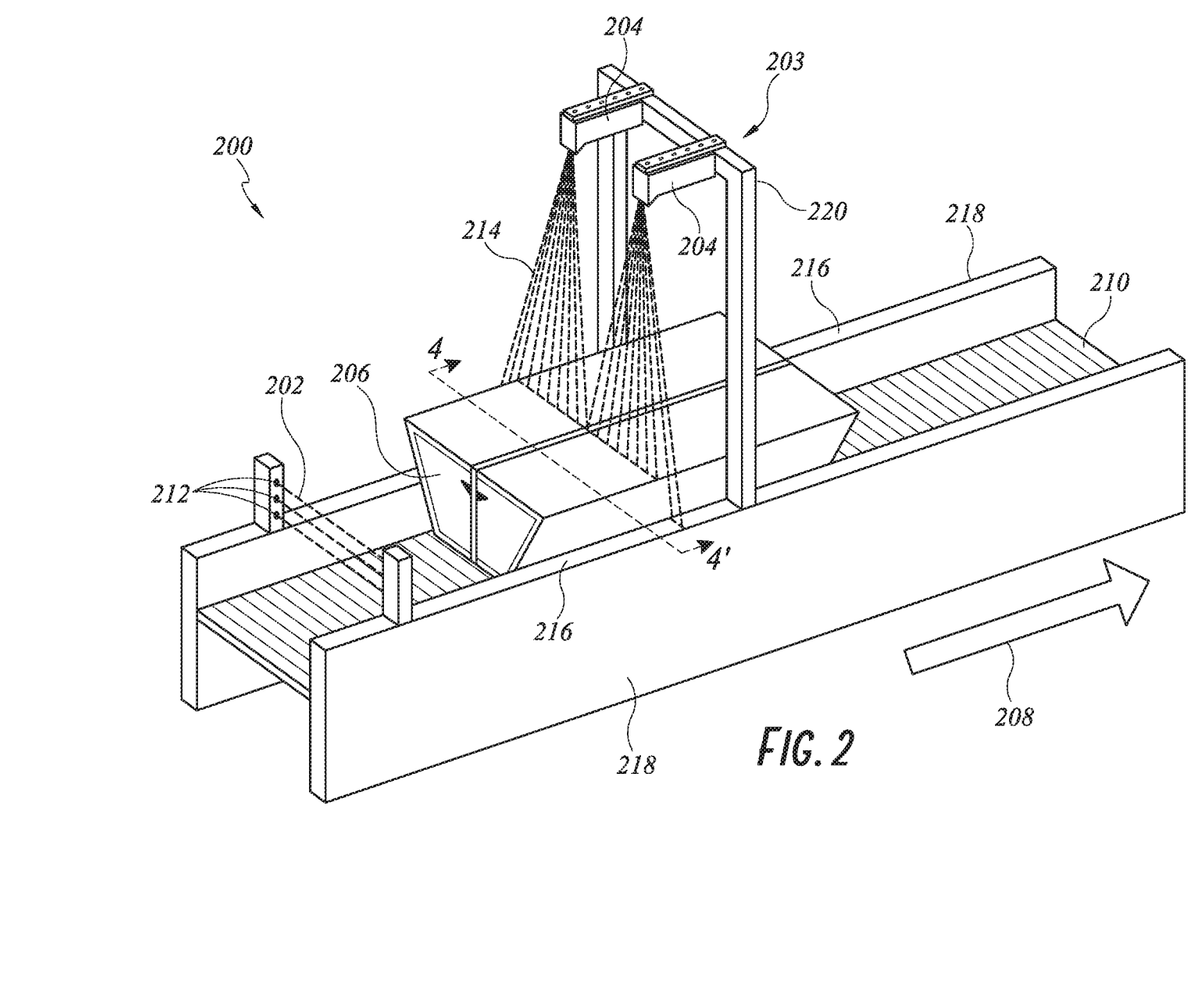
FIG. 2 is a perspective view of an embodiment of a light gate and height profile acquisition device in a sleeve detection system.

FIG. 2 depicts an exemplary arrangement of a light gate 202 and height profile acquisition device 203 in an embodiment of a sleeve detection system 200. The light gate 202 and the height profile acquisition device 203 are mounted on a conveyor 210 with sidewalls 218. The light gate 202 includes one or more light sensors 212. The height profile acquisition device 203 includes a vertically oriented mounting platform 220 disposed across the conveyor 210, perpendicular to a direction of motion 208. At least one optical profile sensor 204 is mounted on the mounting platform 220 above the conveyor 210. The optical profile sensors emit a signal 214, which can be a light signal, IR, UV, or other suitable electromagnetic radiation. In some embodiments, non-optical profile sensing methods, such as ultrasound, may be used. In some embodiments, commercially available optical profile sensors such as the Leuze Electronic LRS 36 may be used.

The optical profile sensors 204 may be located in any position where they are capable of observing, sensing, scanning, or otherwise detecting a surface of a tray 206 on the conveyor 210. In some embodiments, the optical profile sensors 204 are located at the sides of the conveyor 210. In some embodiments, the optical profile sensors 204 are located above the conveyor 210. For example, the optical profile sensor 204 can be secured to the conveyor sidewall 218, another piece of trayline equipment, or the separate frame or mounting platform 220. When mounted above the conveyor 210, the optical profile sensor(s) 204 must be located high enough so as to avoid physically impeding the passage of the tray 206 along the conveyor 210.

Any number of optical profile sensors 204 may be used in the sleeve detection system 200. In some embodiments, a single optical profile sensor 204 provides sufficient measurement capability. The single optical profile sensor 204 can scan a cross-section of the entire upper surface of a tray, or it can scan a portion of the upper surface. In some embodiments, two or more optical profile sensors 204 are used. For example, as many as ten or twenty optical profile sensors 204 could potentially be used in some embodiments, especially where a very high degree of precision is desired, because such devices frequently operate most precisely within smaller viewing angles. In embodiments where two optical profile sensors 204 are used, the two optical profile sensors 204 are spaced across the width of the conveyor 210, and each captures height profiles of approximately one half of the conveyor/tray surface area.

As described above with reference to FIG. 1, the arrangement is configured so that the tray 206 moving in the direction of motion 208 of the conveyor 210 passes through the light gate 202 before passing under the height profile acquisition device 203. The sensors 212 of the light gate 202 can include one or more position sensors, photoelectric sensors, retro reflective sensors, electro-optical sensors, proximity sensors, or the like. In some embodiments, the light gate 202 delivers a status of "open" while no object is present in the light gate. When an object passes through and interrupts the light gate 202, the light gate 202 is triggered and delivers a status of "closed." The light gate 202 remains triggered so long as the object remains within the light gate 202. In some embodiments, the light gate 202 remains closed for a predetermined period of time following triggering. In some embodiments, the light gate 202 remains closed following triggering until another triggering event occurs.

When the light gate 202 is closed, the light gate 202 detects the presence of the tray 206 on the conveyor 210. The system 200 then causes the height profile acquisition device 203 to take one or more height profiles of the tray 206. The optical profile sensors 204 acquire profiles of the tray 206 based on scanning using laser light or other optical distance measuring technology. In some embodiments, transverse height profiles are measured along the width of the tray 206, perpendicular to the direction of motion 208. In some embodiments, longitudinal height profiles may be measured along the length of the tray 206, along the direction of motion 208, either instead of or in addition to transverse height profiles along the width of the tray 206. Longitudinal height profiles are captured, for example, by repeatedly measuring a height of the tray 206 as the tray 206 passes under the stationary optical profile sensor 204. The scanned region for a transverse height profile includes a portion of an upper surface 216 of the conveyor sidewalls 218 and/or a portion of the surface of the conveyor 210 so as to provide at least one reference height for later analysis of sleeve status. In some embodiments, the scanned region includes the furthest point that the sidewall of the tray 206 can extend laterally over the conveyor sidewalls 218, so that the high point of every tray can be detected. Sleeve status analysis is discussed in greater detail below with reference to FIGS. 6 and 7.

In some embodiments, the detection of the tray 206 at the light gate 202 initiates a time delay before height profiles are taken. A time delay allows the conveyor 210 to move the tray 206 to a position at least partially below the height profile acquisition device 203. The time delay can be predetermined, based at least in part on the speed of the conveyor 210 and the distance between the light gate 202 and the height profile acquisition device 203. In this manner the system 200 can avoid wasting time and processing capacity analyzing height profiles of an empty portion of the conveyor 210.

Figure 3:
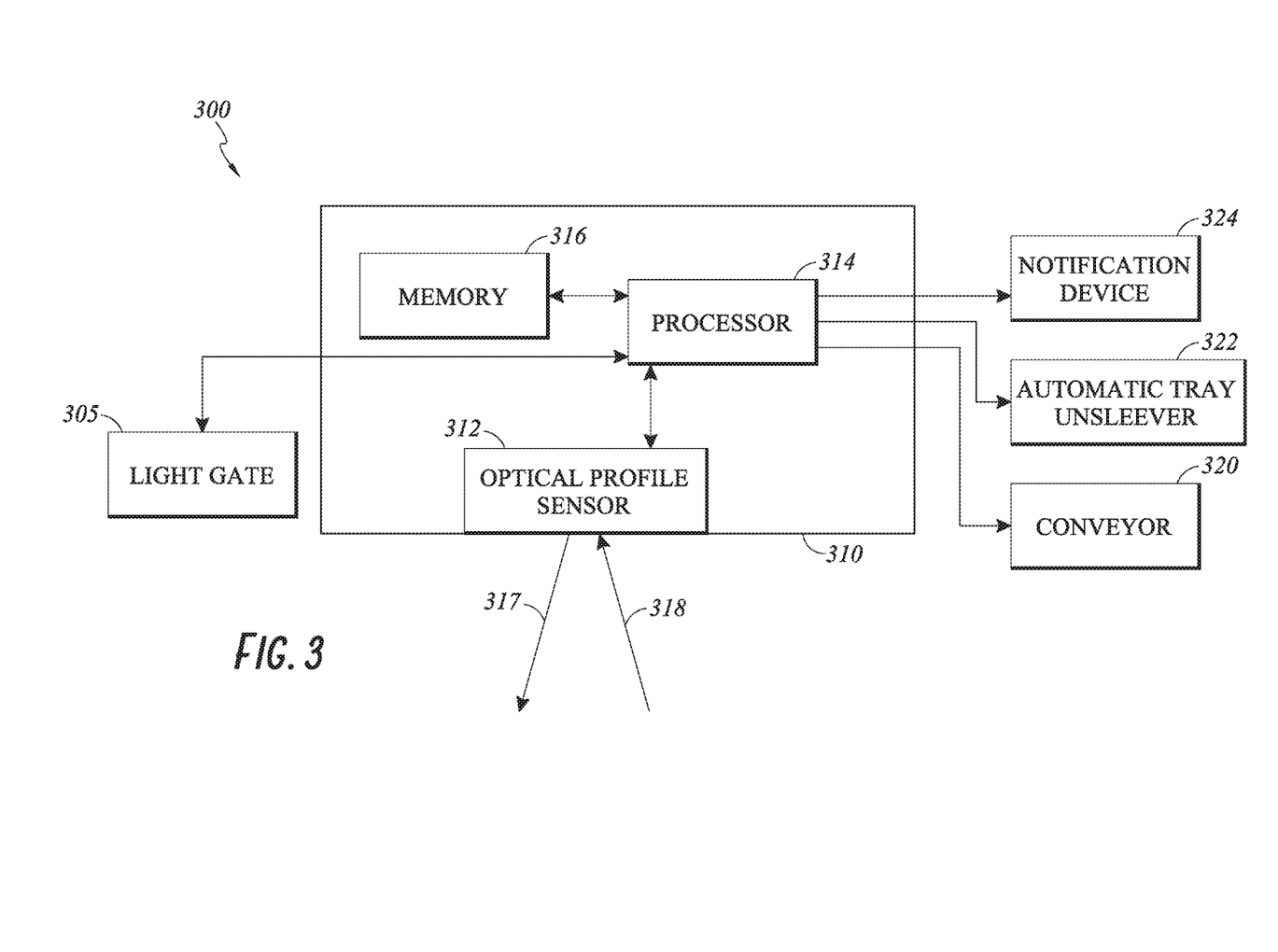
FIG. 3 is a block diagram of a sleeve detection system.

FIG. 3 depicts a block diagram of a sleeve detection system 300 in accordance with an exemplary embodiment. The sleeve detection system 300 includes a light gate 305 in communication with a height profile acquisition device 310, which includes at least one optical profile sensor 312, a processor 314, and a memory 316. The processor is in communication with a trayline conveyor 320, an ATU 322, and a notification device 324.

The optical profile sensor operates by emitting a beam or beams 317 of electromagnetic radiation and detecting a reflected portion 318 of the emitted electromagnetic radiation 317. The electromagnetic radiation 317 can be laser light, infrared light, ultraviolet light, visible light, radio waves, or the like. In some embodiments, non-optical detection methods such as ultrasonic distance sensing or sonar are used. In some embodiments, the sensor 312 has sufficient resolution to be able to detect and distinguish from its surroundings, the sidewall of a tray 104, which can be in the range of 2-3 mm in thickness. The optical profile sensor 312 is in communication with the processor 314 including commands to acquire one or more height profiles. The optical profile sensor 312 can communicate acquired height profiles, error messages related to height profile acquisition failure, or other information to the processor 314. In some embodiments, the height profile acquisition device 310 includes more than one optical profile sensor 312, as described above with reference to FIG. 2. For example, the optical profile sensor 312 scanning objects below might produce less accurate results for points at greater horizontal distances from the midpoint of the scan range. Using two profile sensors 312, each scanning one half of the width of the conveyor, can thus reduce this error to improve the accuracy and/or efficiency of the scanning process, especially where relatively wide conveyors are used.

The processor 314 includes circuitry configured to analyze height profiles to determine sleeve status of a tray 104, initiate height profile acquisition, and/or output a sleeve status or other commands. The processor 314 receives communications from the light gate 305, such as the light gates 108 and 202 described above with reference to FIGS. 1 and 2. In some embodiments, the light gate 305 sends a notification to the processor 314 that a tray has been detected. In response to a notification that a tray is present, the processor 314 sends a command to the optical profile sensor 312 to take one or more height profiles of the tray, either immediately or after a predetermined time delay. The time delay can be based on the physical distance separating the light gate 108 and the optical profile sensor 110, on the speed of the conveyor 102, or both.

The processor 314 also receives communications from the optical profile sensor 312, including acquired height profiles or error messages related to height profile acquisition failure, as described above. Upon receiving a height profile from the optical profile sensor 312, the processor 314 may immediately analyze the height profile to determine sleeve status, or may send the height profile data to the memory unit 316 for storage and/or later analysis. In some embodiments, multiple height profiles are used to make a sleeve status determination. Where multiple height profiles are used, the processor 314 can analyze two or more profiles simultaneously received from multiple optical profile sensors 312, and/or any number of height profiles stored in the memory unit 316.

The processor 314 sends messages to various external devices outside of the height profile acquisition device 310. For example, the processor 314 can send a command to the conveyor 320 to cause the conveyor 320 to send a tray to an alternate location based on its sleeved or unsleeved status, as described above with reference to FIG. 1. For example, a command from the processor 314 to the conveyor 320 might cause a tray to be sent to the ATU 322, or directed to a location for human intervention or evaluation. In some embodiments, the processor 314 can send a command to the ATU 322 to cause the ATU 322 to unsleeve or not unsleeve a tray based on the determined sleeve status of the tray. In some embodiments, the processor 314 sends a communication to the notification device 324 to notify an operator of the status of a tray or an error in the sleeve status evaluation process. The notification device 324 can include any combination of lights and/or sounds to attract the attention of a nearby operator, a message displayed on a notification screen of the sleeve detection system or of another device, a message sent to a personal communication device of an operator, or any other system configured to alert an operator of a tray status.

Figure 4A:
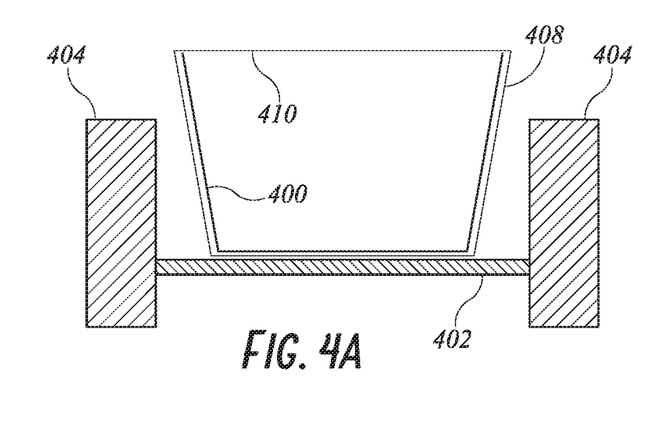
FIG. 4A shows a cross-sectional view of an exemplary sleeved tray with a properly fit sleeve, taken along line 4-4' of FIG. 2.
Figure 4B:
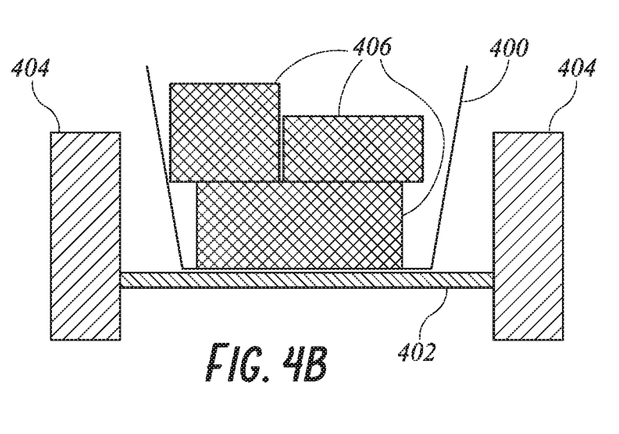
FIG. 4B shows a cross-sectional view of an exemplary partially filled tray without a sleeve, taken along line 4-4' of FIG. 2.
Figure 4C:
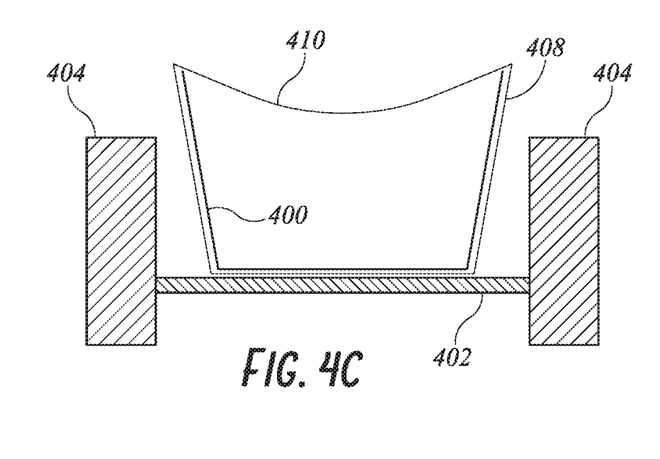
FIG. 4C shows a cross-sectional view of an exemplary sleeved tray with a loose-fit sleeve, taken along line 4-4' of FIG. 2.
Figure 4D:
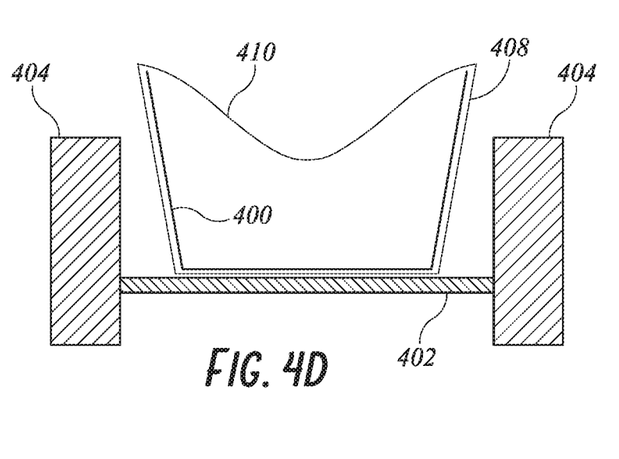
FIG. 4D shows a cross-sectional view of an exemplary sleeved tray with a crushed sleeve, taken along line 4-4' of FIG. 2.

FIGS. 4A, 4B, 4C, and 4D illustrate four potential sleeve configurations that are at least partially exemplary of the many configurations that may exist with trays in a trayline. Each of FIGS. 4A, 4B, 4C, and 4D shows a cross-sectional view of a tray 400 on a conveyor 402 bounded by conveyor sidewalls 404. The trays 400 in FIGS. 4A, 4C, and 4D are various types of sleeved trays, while the tray 400 in FIG. 4B does not have a sleeve. For simplicity, any tray contents 406 are not shown for the sleeved trays 400 of FIG. 4A, 4C, or 4D because the sleeve shields the contour of the tray contents from the height profile acquisition device 109. Because the tray 400 of FIG. 4B does not have a sleeve, the contents 406 of the tray 400 will be visible to a height profile acquisition device mounted above the conveyor 402. Thus, the height profile acquired by the height profile acquisition device for the sleeveless tray 400 will be determined by the shape of the tray's contents 406, while the height profile for the tray 400 with a sleeve will be determined by the shape of an upper surface 410 of a sleeve 408.

The tray 400 depicted in FIG. 4A has a properly fit sleeve 408. A primary characteristic of the properly-fit sleeve 408 is a substantially or mostly flat, level upper surface 410, running substantially parallel to the conveyor 402 and the bottom of the tray 400. In contrast, the tray 400 depicted in FIG. 4C has a loose-fitting sleeve 408, which results in a sagging or concave upper surface 410. In FIG. 4D, the sleeve 408 is crushed, which can occur as a result of a sudden impact or excess weight being placed on top of the sleeve 408 during transit or storage of the trays 400. The crushed sleeve 408 has a deeply indented upper surface 410. The crushed upper sleeve surface 410 may be indented or deformed far enough from the substantially flat upper surface 410 shown in FIG. 4A as to cause a false "no sleeve" indication during the sleeve status analysis under some conditions, because the crushed upper surface 410 of the sleeve 408 follows a contour similar to the inner surface of the tray 400. Methods of detecting crushed sleeves are described in greater detail below with reference to FIG. 7.

A set of height data points may be obtained in a variety of ways. An exemplary method is described here with reference to FIG. 1 and FIGS. 4A-5D. First, the height profile sensed by the optical profile sensor 110 is plotted on a horizontal x-axis 532 and a vertical y-axis 534. In some embodiments, an incremental x value is then chosen, and the y-value of the height profile is taken at each increment. For example, if the incremental x-value is 1 mm, y-values would be taken at 1 mm, 2 mm, 3 mm, etc. In some embodiments, the incremental x-value can be smaller or larger than 1 mm. These sampled y-values are recorded across the x-axis 532 at each incremental x-value as a set of height data points.

In some embodiments, the height profile is divided into bins of a set width along the x-axis 532, and the average height within each bin evaluated to determine a height data point. In some embodiments, each bin is divided in to a number of increments, and a height for each increment recorded. The heights for each increment within the bin are recorded and averaged to obtain the average height within each bin. The incremental x-value or bin width should be small enough so as to capture an accurate representation of the vertical profile of the tray, but not so small as to exceed the resolution limit of the optical profile sensor or create an unduly large number of data points that may cause delays or errors in processing. It is expected that a person having ordinary skill in the art will be able to determine an appropriate incremental x-value or bin size. It is noted that the numeric height data sets 504, 508, 512, 516 depicted in FIGS. 5A, 5B, 5C, and 5D are simplified for demonstration purposes. In most embodiments, a height profile of a tray will be converted into a much larger set of points corresponding to a smaller incremental x-value. In some cases, appropriate incremental x-values may result in numeric height data sets with dozens, hundreds, or even thousands of points representing a scanned height profile.

FIGS. 5A, 5B, 5C, and 5D depict example height profiles 522 and corresponding sets of numeric height data points 504, 508, 512, 516 corresponding to the trays depicted in the cross-sectional views of FIGS. 4A, 4B, 4C, and 4D, respectively. When the optical profile sensor 110 mounted above the conveyor 402 is used to capture height profile data, the output of the optical profile sensor 110 can be represented as a linear profile of only the upper surface of the objects detected by the optical profile sensor 110. Accordingly, the height profiles 522 in FIGS. 5A-D can comprise several discrete segments or components which correspond to various features of the conveyor and trays in the sleeve detection system. The segments of the height profile include a conveyor surface segment 518 (corresponding to the surface of the conveyor 402), a sidewall surface segment 520 (corresponding to the conveyor sidewalls 404), a top surface segment 522 (which corresponds to the surface of the sleeve 408, or if there is no sleeve, with the contents of the tray 400), and a tray sidewall segment 526 (corresponding to the sidewall and bottom surface of the tray 400 if no sleeve 408 is present). In some cases a tray may be oriented at an angle or shifted/justified toward the left or right of the conveyor, resulting in a height profile that does not include the conveyor surface 518 on one or both sides of the tray. As described below with reference to FIG. 7, such rotation, shifting, or justification of a tray will not prevent accurate sleeve status determination when the methods described herein are applied.

Figure 5A:
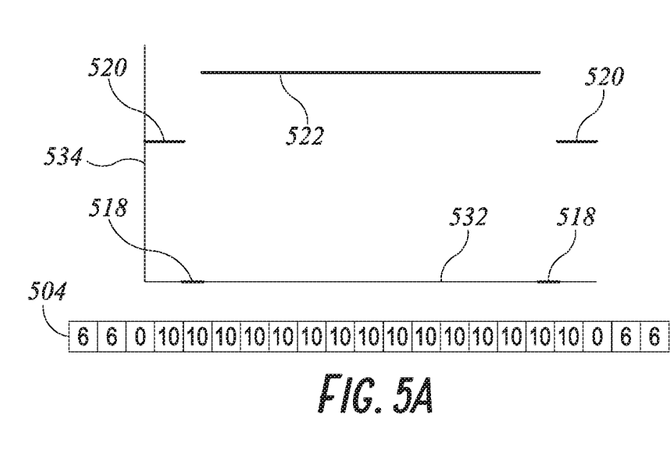
FIG. 5A is a graphical representation of a height profile and a corresponding set of numeric height data points consistent with the sleeved tray of FIG. 4A.

The height profile depicted in FIG. 5A corresponds to the sleeved tray 400 of FIG. 4A. Here, the height profile includes the generally straight horizontal portion 522 corresponding to the generally straight upper surface 410 of the properly-fit sleeve 408 as depicted in FIG. 4A. The height profile also includes the segments 518 and 520 representing the detected height of the conveyor 402 and the sidewalls 404, respectively.

Figure 5B:
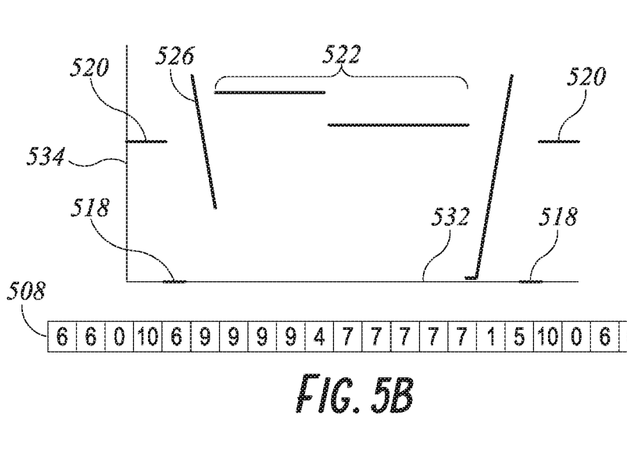
FIG. 5B is a graphical representation of a height profile and a corresponding set of numeric height data points corresponding to the sleeveless tray of FIG. 4B.

The height profile depicted in FIG. 5B corresponds with the sleeveless tray of FIG. 4B. Unlike the height profile of the sleeved tray of FIG. 4A, the height profile of the sleeveless tray is of a more irregular shape, with the top surface segments 522 corresponding to the upper surface of the contents 406 of the tray 400 as depicted in FIG. 4B. The absence of a sleeve may also cause the height profile to include the tray sidewall surface segments 526 corresponding to the interior surfaces of the sides and bottom of the tray 400. For sleeveless trays generally, at least a small portion of the bottom or lower internal sidewalls of the tray 400 may be visible to the optical profile sensor 110 mounted above a conveyor, even when the sleeveless tray is mostly filled with items.

Figure 5C:
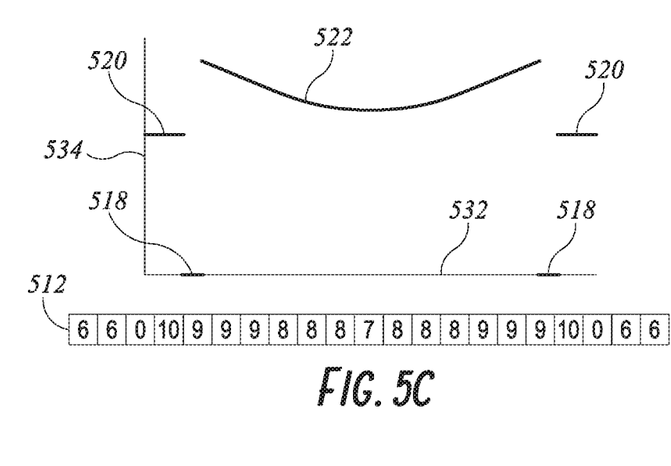
FIG. 5C is a graphical representation of a height profile and a corresponding set of numeric height data points corresponding to the loose-fit sleeved tray of FIG. 4C.
Figure 5D:
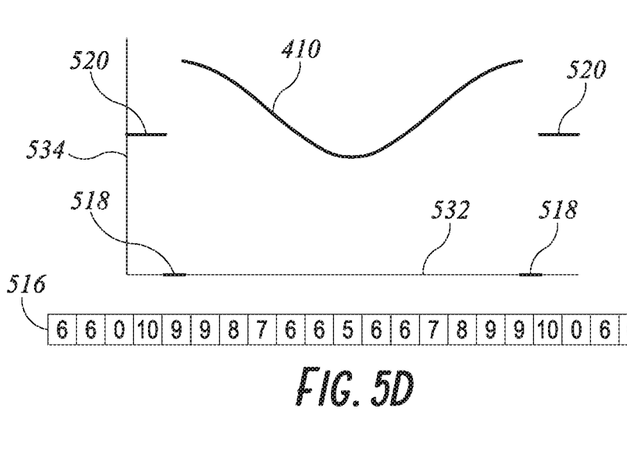
FIG. 5D is a graphical representation of an example height profile and a corresponding set of numeric height data points corresponding to the tray with a crushed sleeve of FIG. 4D.

Moving to FIG. 5C, the height profile corresponds with the loosely-fit sleeve on the tray 400 of FIG. 4C. Here, the height profile includes the top surface segment 522 which corresponds to the sagging upper surface 410 of the loose-fit sleeve 408 depicted in FIG. 4C. Similarly, the height profile depicted in FIG. 5D corresponds with the tray with crushed sleeve of FIG. 4D. In FIG. 5D, the top surface segment 522 has a more significantly concave shape which corresponds to the deeply indented upper surface 410 of the crushed sleeve 408 depicted in FIG. 4D. As depicted in FIGS. 5C and 5D, the height of the top surface segment 522 is a continuous line following the contour of the sleeve 408. In some embodiments, the surface segment 522 of a tray 400 of FIG. 4C or 4D may be a series of points taken at the x-value increment, and may appear as points, or short line segments. In some embodiments, the points taken at the x-value increment may be fit to a curve, or may be connected in a segmented line.

Referring again to FIGS. 5A, 5B, 5C, and 5D, every height profile is converted to a set of numeric height data points, or every set of numeric height data points can be converted to a height profile For example, the set of height data points 504, 508, 512, and 516 are derived from the height profiles depicted in FIGS. 5A-D, respectively. In some embodiments, an optical profile sensor provides an output consisting of only a set of height data points, rather than a two-dimensional height profile. In such embodiments, the set of height data points obtained from the optical profile sensor is used directly for analysis without requiring the conversion steps described below.

Figure 6:
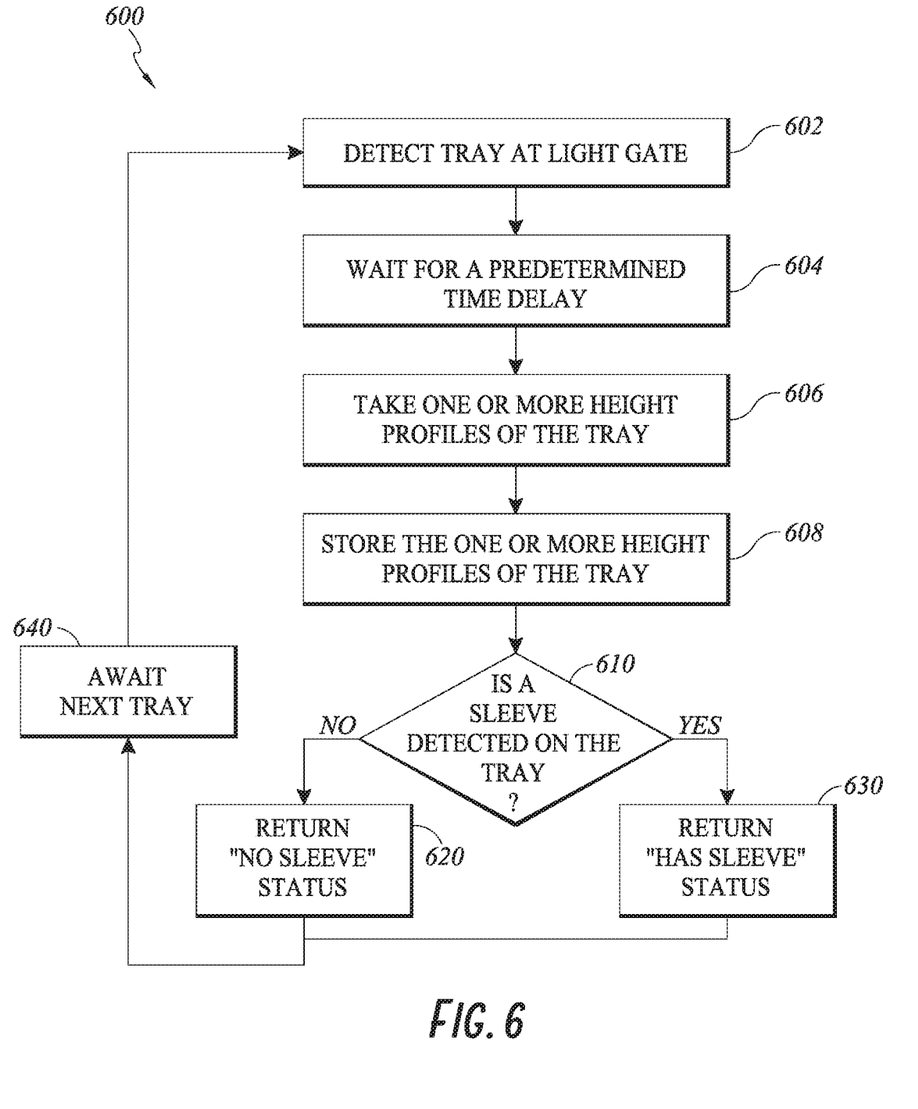
FIG. 6 is a flowchart illustrating an exemplary method for using a sleeve detection system to determine the sleeve status of a tray.

FIG. 6 is a flowchart illustrating an exemplary method 600 for using a sleeve detection system to determine the sleeve status of a tray. The method 600 can be performed automatically by a computer system integrated with a sleeve detection system in a trayline as depicted in FIG. 1.

The method 600 begins with block 602, where a tray is detected at the light gate 108. The light gate 108 includes any of various types of sensors as described above with reference to FIG. 2. The light gate 108 is disposed across the conveyor 102 of a trayline, so as to cause the light gate 108 to be activated any time a tray 104 reaches the light gate 108 while traveling on the conveyor 102. After the tray 104 is detected at the light gate 108, the method 600 continues to block 604.

At block 604, the method 600 waits for a predetermined time delay. In some embodiments, the light gate 108 is located some distance along the conveyor 102 from the height profile acquisition device 109. Thus, a time delay improves the efficiency and accuracy of the method 600 by allowing the detected tray 104 to travel from the light gate 108 to a position along the conveyor 102 directly below the height profile acquisition device 109 before height profiles are taken. The duration of the time delay may be selectable by a human operator, or may be an automatic function. In some embodiments, the time delay is manually or automatically selected based on the speed of the conveyor and the distance between the light gate 108 and the height profile acquisition device 109. In some embodiments, the computer system is configured to automatically adjust the time delay based on changes in the speed of the conveyor. After the predetermined time delay elapses, the method 600 continues to block 606.

At block 606, one or more height profiles of the tray 104 are taken by the height profile acquisition device 109. In some embodiments, the method requires only a single height profile to be taken. In other embodiments, the method requires two or more height profiles to be taken as the tray passes by the height profile acquisition device 109. Each height profile will correspond to a different portion of the tray because height profiles are taken as the tray 104 is moving by the stationary height profile acquisition device 109. Accordingly, the use of multiple height profiles increases the confidence and/or accuracy of a sleeve status determination by reducing the effect of a single anomalous height profile or of a small irregularity in the geometry of a tray 104 in the system. In some embodiments, the height profile acquisition device 109 continues taking height profiles as long as the light gate 108 remains triggered, or "open." The acquisition of height profiles terminates when the light gate 108 no longer detects the presence of a portion of the tray 104.

After one or more height profiles of the tray are taken, the method 600 continues to block 608, where the one or more height profiles are stored. Storage occurs in the computer memory unit 316, which can be a part of the height profile acquisition device 310 or part of a separate computer system as described elsewhere herein. In some embodiments, storage is temporary with height profiles being stored only until they are analyzed to determine sleeve status and automatically deleted thereafter. In some embodiments, height profiles are stored longer or indefinitely.

After one or more height profiles of the tray are stored, the method 600 continues to decision state 610, where a sleeve status of the tray 104 is determined based on the one or more height profiles. In some embodiments, the system can return a sleeve status of the tray 104 of either "sleeve" or "no sleeve," depending on whether a sleeve is detected on the tray 104. In some embodiments, additional sleeve status options are available. For example, the sleeve detection system might be able to detect deviations from ideal conditions such as a dented sleeve, or abnormal conditions such as a tray partially within a sleeve. Methods for analyzing height profiles to determine the sleeve status of a tray are discussed in detail below with reference to FIG. 7. After a sleeve status of the tray 104 is determined, the method 600 either returns a "no sleeve" status 620 if it is determined that the tray 104 does not have a sleeve, or returns a "sleeve" status 630 if it is determined that the tray 104 has a sleeve. Any necessary action, such as removing the tray 104, sending the tray 104 to an ATU, or removing the tray 104 from the conveyor 102 for operator intervention, can be taken after the sleeve status is determined. For example, in the system depicted in FIG. 1, the tray is sent along the first path 114 for appropriate processing if determined to have a "no sleeve" status, and is sent along the second path 118 to an ATU if determined to have a "sleeve" status. A notification can be sent to an operator based on either or both outcomes. After a sleeve status is returned, the method continues to block 640, where it awaits the next tray before returning to block 602 to repeat indefinitely.

Figure 7:
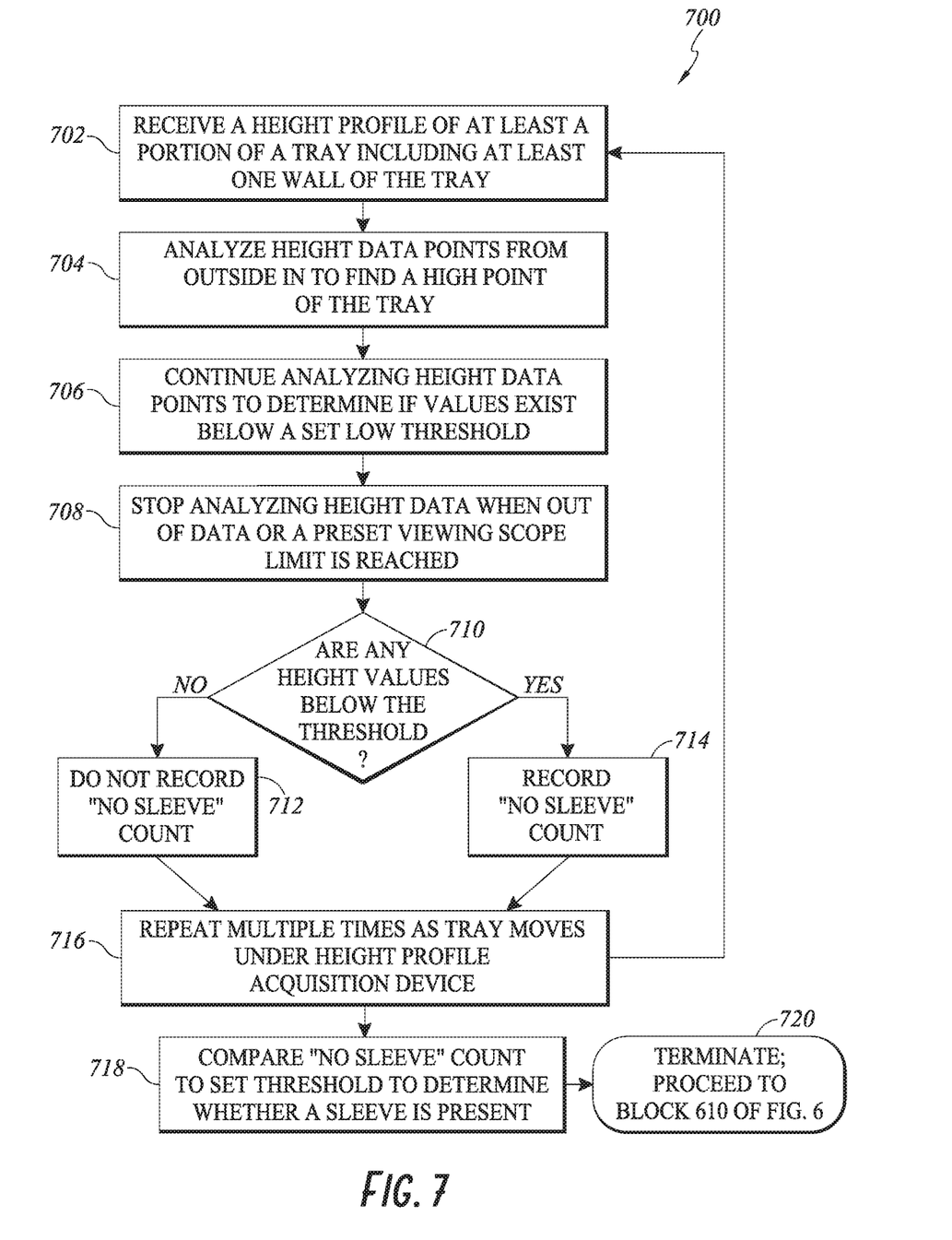
FIG. 7 is a flowchart illustrating an exemplary method of analyzing one or more height profiles of a tray to determine the sleeve status of a tray.

FIG. 7 is a flowchart illustrating in greater detail an exemplary method 700 of analyzing one or more height profiles of a tray to determine the sleeve status of the tray. Sleeve status analysis can be performed by the processor 314 of the height profile acquisition device 310, or by other processing circuitry connected to a sleeve detection system, such as an external computer system. The method 700 begins at block 702 by receiving a height profile of at least a portion of a tray including at least one wall of the tray. The height profile is received from a height profile acquisition device 109 as described above with reference to FIG. 1, or from any other system configured to capture height profiles. In some embodiments, the height profile includes a set of height data points or a two-dimensional profile which is converted to a set of height data points for analysis, as described above with reference to FIG. 6.

After the height profile is received, the method 700 continues to block 704, where height data points are analyzed from the outside in to find a high point of the tray. Outside-in analysis of a height profile begins with data points corresponding to the conveyor sidewalls 404. The height of the conveyor sidewall 404 is used as a high threshold value, so that the detection of a point higher than the conveyor sidewall 404 will indicate the initial high point of the tray 400, located at the outer edge of the tray 400.

Using the conveyor sidewall height as a high threshold is an effective way to detect the outer edge of the tray 400 because trays are generally taller than the sidewalls 404 of trayline conveyors. Moreover, locating the tray edge by using a high threshold, rather than looking for a particular height or lateral location, allows for trays of various heights, lengths, widths, and orientations to be detected by the same sleeve detection system.

When the high point of the tray 400 is determined, the method continues to block 706, where the method continues analyzing height data points to determine if any values exist below a set low threshold. The low threshold should be a predetermined value lower than the high point of the tray 400, but higher than the inside bottom surface of the tray 400. Preferably, the low threshold will be set at a height value likely to be observed when a sleeveless tray passes through the sleeve detection system, but unlikely to be observed for a sleeved tray. For example, the low threshold can be somewhat lower than the high point to avoid a false "no sleeve" detection when a loose-fit sleeve sags lower than the high point. However, the low threshold should also be somewhat higher than the inside bottom surface of the tray because sleeveless trays sometimes contain letters, packages, or other items that completely cover the inside bottom of the tray 400. In a partially-filled sleeveless tray, the lowest height profile is likely to occur at a point along the sloped inner side wall of the tray.

After the analysis of height data points has begun, the method 700 continues analyzing additional height data points until the method 700 moves to block 708, where it stops analyzing height data points when it reaches either the end of the set of height data points or a preset viewing scope limit. A preset viewing scope limit is a set maximum number of data points to consider in a single height profile analysis, based on the distance along the horizontal cross-section of the conveyor 102 and/or tray 104. A preset viewing scope limit can help to avoid mistakenly identifying sleeved trays with crushed sleeves as sleeveless trays, as is described in greater detail below. In some embodiments, a preset viewing scope limit can be employed when multiple optical profile sensors 110 are used. For example, where two optical profile sensors 110 are used, the analysis for each height profile should be terminated at the centerline of the conveyor 102 to reduce inaccuracy resulting from higher viewing angles.

When the analysis of height data points has concluded, the method 700 continues to decision state 710, where the method 700 determines whether any of the analyzed height data points were lower than the preset low threshold. If at least one of the analyzed height data points was lower than the preset low threshold, the method 700 continues to block 714, where a "no sleeve" count is recorded and stored. However, if none of the analyzed height data points is lower than the preset low threshold, the method 700 proceeds instead to block 712. At block 712, the method 700 continues without recording a "no sleeve" count, or by recording a "sleeve" or "has sleeve" count.

After block 712 or 714 is completed, the method 700 continues to block 716, where blocks 700-712 or 700-714 are repeated multiple times with some or all of the height profiles acquired as the tray 104 moves under the height profile acquisition device 109. After some or all of the acquired height profiles have been analyzed and the corresponding "no sleeve" counts have been recorded where appropriate, the method 700 continues to block 718, where the number of "no sleeve" counts is compared with a set threshold to make the final determination of sleeve status. For example, the method 700 might require a threshold of five "no sleeve" counts to determine that a tray does not have a sleeve. In some embodiments, the "no sleeve" count threshold is as low as one, but can be much larger, so long as the threshold is no greater than the total number of height profiles analyzed. Using a threshold greater than one has the advantage of reducing the effect of a single erroneous reading or a physical anomaly such as a hole or puncture in the top of a sleeve. If the number of "no sleeve" counts is lower than the "no sleeve" count threshold, the method 700 returns a sleeve status of "has sleeve." If the number of "no sleeve" counts is equal to or greater than the "no sleeve" count threshold, the method 700 returns a sleeve status of "no sleeve." Once a sleeve status has been determined, the method 700 continues to block 720, where the method 700 terminates. The determined sleeve status is then used in block 610, described above with reference to FIG. 6, so that appropriate action can be taken based on the sleeve status of the tray 104. In some embodiments, the system can determine sleeve status by comparing the number of "no sleeve" counts with "sleeve" counts. In this alternative method, the threshold for determining a sleeve status can be in the form of an arithmetic difference between the "no sleeve" and "sleeve" counts (e.g., return "no sleeve" status if there are at least 10 more "no sleeve" counts than "sleeve" counts) or in the form of a ratio (e.g., return "no sleeve" status if there are at least twice as many "no sleeve" counts as there are "sleeve" counts).

An exemplary application of the sleeve status analysis method 700 will now be described with simultaneous reference to FIG. 7 and the height profile of FIG. 5A. At block 702, a height profile is obtained from an optical profile sensor. From the height profile, the corresponding set of height data points 504 are derived. The method 700 continues to block 704, where the height data points 504 are analyzed. The first two data points analyzed will have a value of "6," corresponding to the height of the conveyor sidewall 520. The third data point analyzed has a value of "0," corresponding to the height of the conveyor surface 518. The fourth data point analyzed will have a value of "10," indicating a high point of the tray. Having identified a high point of the tray, the method 700 continues to block 706, where additional height data points are analyzed to determine if any values exist below a set low threshold. An exemplary low threshold might be "6," such that any points detected lower than the height of the conveyor sidewall 520 will trigger a "no sleeve" count. The method 700 will reach the second edge of the tray, where it will again detect the conveyor at height "0" followed by the conveyor sidewall at height "6," proceeding to block 708 to stop analyzing height data. The method 700 would continue to the decision of block 710. For the height data set 504, corresponding to a properly-fit sleeved tray, the method 700 would not have detected any points lower than the threshold. Thus, the method 700 would continue through block 712 to block 716, without recording a "no sleeve" count. The method 700 would then return to block 702 if additional height profiles remain to be analyzed.

The analysis would proceed in a similar manner for the height profile of FIG. 5B. However, because this height profile 506 corresponds to a sleeveless tray, the corresponding height data set 508 is noticeably different from the height data set 504. After detecting the high point of the tray at height "10," the method 700 would continue until reaching the tenth point in the set, which has a value of "4." If the same low threshold value of "6" is used, "4" would be lower than the low threshold. Thus, upon reaching block 710, the method 700 will instead determine that a height below the threshold exists, and proceed to block 714, where a "no sleeve" count will be recorded. The method 700 then continues to block 716 as described above.

In some embodiments where the analysis is terminated at the centerline, each half of the height profile 506 can be analyzed separately. Thus, after concluding the analysis of the left half of the height data set 508 at block 716, the method returns to block 702 and perform the same analysis on the right half of the height data set 508, beginning with the outer right edge and moving inward to the left. For the right half of the height data set 508, the high point will again be detected at height "10," followed by "5" and "1." After analyzing the remainder of the right half of the data set 508, the decision at block 710 will again be answered "yes" because both "5" and "1" fall below the exemplary threshold of 6. Again, a "no sleeve" count will be recorded at block 714, and the analysis will continue to block 716 as described above.

As described above, some sleeves may be encountered with crushed upper surfaces that can cause false "no sleeve" readings. Referring now to FIG. 5D, a height profile 514 corresponds to a crushed sleeve. A crushed sleeve can cause erroneous "no sleeve" counts to be recorded if a portion of the sleeve is crushed to a height below the low threshold. For example, if the height data set 516 is used with a low threshold of 6, the point at the middle of the tray will be found below the threshold, and a "no sleeve" count will be recorded. Selecting a lower threshold helps to avoid this problem. However, lowering the threshold can also increase the frequency of mistakenly detecting sleeveless trays as having sleeves.

In some embodiments, to avoid detecting crushed sleeves as sleeveless trays, the preset viewing scope limit in block 708 of the method 700 can be decreased in some embodiments. Thus, the analysis is performed based only on outer portions of a tray, and the middle, where low values are likely to be found in crushed trays, is omitted. For example, when analyzing the height data set 516, a viewing scope limit might be selected such that only 9 points are analyzed from each side moving inward. Thus, most of the tray height profile 514 would still be analyzed, but the middle three points of the height data set 516 would be omitted from the analysis, and the false "no sleeve" count would be avoided.

Viewing scope limits are a generally effective method for avoiding the misdetection of crushed sleeves because crushed sleeves are most likely to have their lowest points near the middle of a tray, where the sleeve is least supported. Conversely, sleeveless trays are most likely to have their lowest points at the edges, adjacent to the sidewalls of the tray. Thus, the points near the middle of the conveyor are least significant to the analysis, and their omission tends to reduce the frequency of erroneous sleeve status determinations.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A sleeve detection system comprising:
   a conveyor for transporting a tray within a tray transport system;
   a height profile sensor disposed proximate the conveyor and configured to determine a height profile of the tray, the height profile corresponding to a cross-section of the tray; and
   at least one processor in communication with the height profile sensor, the at least one processor configured to:
   receive the determined height profile from the height profile sensor;
   determine a plurality of height data points along the height profile;
   process the plurality of height data points to determine, based on at least two height data points of the plurality of height data points, a sleeve status data point corresponding to the height profile; and
   determine a transport destination for the tray from a plurality of available transport destinations based at least in part on the determined sleeve status data point.

2. The tray processing apparatus of claim 1, wherein the processor is further configured to analyze the sleeve status data point to determine a sleeve status of the tray.

3. The tray processing apparatus of claim 1, wherein the height profile sensor comprises an optical profile sensor.

4. The tray processing apparatus of claim 1, wherein determining the plurality of height data points comprises recording a set of sampled height values taken from the height profile at a predetermined incremental spacing along the height profile.

5. The tray processing apparatus of claim 1, wherein determining the plurality of height data points comprises:
   dividing the height profile into a plurality of bins having a predetermined bin width along the height profile; and
   recording an average height value for each of the plurality of bins.

6. The tray processing apparatus of claim 1, wherein the at least two height data points of the plurality of height data points comprise:
   a first height data point corresponding to a high point of the tray; and
   a second height data point relatively nearer a centerline of the conveyor than the first height data point.

7. The tray processing apparatus of claim 6, wherein the at least one processor determines the first height data point by identifying an outermost height data point having a height value greater than a predetermined high threshold.

8. The tray processing apparatus of claim 6, wherein the sleeve status data point is associated with an unsleeved status when the second height data point is lower than a predetermined low threshold.

9. The tray processing apparatus of claim 1, wherein the conveyor comprises a diverter in communication with the processor, and wherein the processor is further configured to cause the diverter to direct the tray along a first path or a second path of the conveyor based on the determined transport destination.

10. The sleeve detection system of claim 9, wherein the cross-section is parallel to a tray transport direction of the conveyor.

11. A method of detecting a sleeve status of a tray, the method comprising:
   receiving, from a height profile sensor of a sleeve detection system, a height profile of a tray being processed within a tray transport system, the height profile corresponding to a cross-section of the tray;
   processing the height profile to determine a plurality of height data points corresponding to the height profile;
   determining a sleeve status data point corresponding to the height profile based on at least two height data points of the plurality of height data points; and
   determining a transport destination for the tray from a plurality of available transport destinations based at least in part on the determined sleeve status data point.

12. The method of claim 11, further comprising determining a sleeve status of the tray based at least in part on the sleeve status data point.

13. The method of claim 11, wherein determining the plurality of height data points comprises recording a set of sampled height values taken from the height profile at a predetermined incremental spacing along the height profile.

14. The method of claim 11, wherein determining the plurality of height data points comprises:
   dividing the height profile into a plurality of bins having a predetermined bin width along the height profile; and
   recording an average height value for each of the plurality of bins.

15. The method of claim 11, wherein the at least two height data points of the plurality of height data points comprise:
   a first height data point corresponding to a high point of the tray; and
   a second height data point relatively nearer a centerline of the conveyor than the first height data point.

16. The method of claim 15, further comprising determining the first height data point by identifying an outermost height data point having a height value greater than a predetermined high threshold.

17. The method of claim 16, wherein the predetermined high threshold corresponds to a height of a sidewall of the tray transport system.

18. The method of claim 15, wherein the sleeve status data point is associated with an unsleeved status when the second height data point is lower than a predetermined low threshold.

19. The method of claim 11, wherein the cross-section is parallel to a tray transport direction of the tray transport system.

20. The method of claim 11, further comprising:
  receiving a notification from a tray detector located along the tray transport system proximate the height profile sensor; and
  causing the height profile sensor to generate the height profile based on the notification.

* * * * *

UNITED STATES PATENT AND TRADEMARK OFFICE
CERTIFICATE OF CORRECTION

PATENT NO. : 10,815,070 B2  
APPLICATION NO. : 16/716255  
DATED : October 27, 2020  
INVENTOR(S) : Austin C. Bouchard et al.

Page 1 of 1

It is certified that error appears in the above-identified patent and that said Letters Patent is hereby corrected as shown below:

In the Claims

In Column 17, Line 58, Claim 2, delete "tray processing apparatus" and insert --sleeve detection system--.

In Column 17, Line 61, Claim 3, delete "tray processing apparatus" and insert --sleeve detection system--.

In Column 17, Line 63, Claim 4, delete "tray processing apparatus" and insert --sleeve detection system--.

In Column 18, Line 1, Claim 5, delete "tray processing apparatus" and insert --sleeve detection system--.

In Column 18, Line 7, Claim 6, delete "tray processing apparatus" and insert --sleeve detection system--.

In Column 18, Line 14 (Approx.), Claim 7, delete "tray processing apparatus" and insert --sleeve detection system--.

In Column 18, Line 19, Claim 8, delete "tray processing apparatus" and insert --sleeve detection system--.

In Column 18, Line 23, Claim 9, delete "tray processing apparatus" and insert --sleeve detection system--.

Signed and Sealed this  
Second Day of March, 2021

Drew Hirshfeld  
*Performing the Functions and Duties of the  
Under Secretary of Commerce for Intellectual Property and  
Director of the United States Patent and Trademark Office*